Jan. 7, 1958  R. H. OLNHAUSEN  2,818,774
REMOVABLE ATTACHMENT LENSES FOR SPECTACLES
Filed June 1, 1954
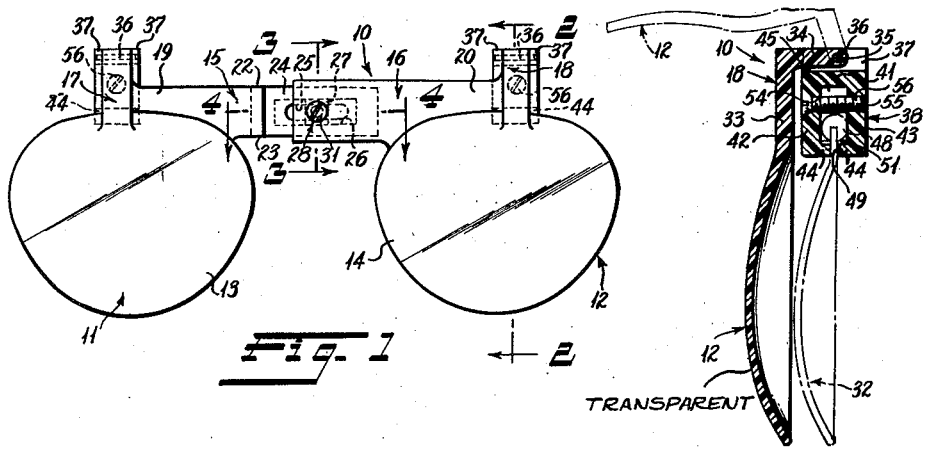
INVENTOR
ROLAND H. OLNHAUSEN
BY *Strauch, Nolan & Diggins*
ATTORNEYS

2,818,774
Patented Jan. 7, 1958

2,818,774

REMOVABLE ATTACHMENT LENSES FOR SPECTACLES

Roland H. Olnhausen, Cambridge, Ohio

Application June 1, 1954, Serial No. 433,599

8 Claims. (Cl. 88—41)

The present invention relates to an improved ophthalmic mounting and has particular reference to improved removable auxiliary lens attachments to provide an auxiliary correction for users of spectacle type eye glasses.

It has been long recognized that many persons requiring prescription lenses to overcome presbyopia are unable physiologically to make use of the conventional bi-focal button type lenses and that still others, due to the nature of their work and other activities, are unable to safely use such bi-focal lenses or in lieu thereof provide themselves with two pairs of spectacles provided respectively with normal vision lenses and close work or reading lenses. This problem is particularly acute in the case of tradesmen such as mechanics, bricklayers, painters and the like who often are compelled to work upon high scaffolds, ladders and in close cramped and abnormal positions where the head movements required in the bi-focal type lenses or the changing from one type of spectacles to the other is physically impossible if they are to work efficiently.

Attempts have been made in the past to meet this problem by provision of attachment lenses. These prior attempts have involved the utilization of ground glass lenses independently mountable in full frames provided with suitable attachment clips or the like for mounting the auxiliary lenses on the regular spectacles as exemplified by United States Letters Patent 624,445, 2,071,331 and 2,640,390.

It is the primary object of this invention to provide corrective attachment lenses that are light in weight, eliminate the need for expensive ground glass lenses and separate mounting frames and are relatively adjustable in a transverse direction to vary the interpupillary distance between the lenses thereby providing a universal attachment.

Still another object of the present invention resides in the provision of auxiliary attachment lenses in the form of integrally molded plastic lenses, bridge connectors and attachment projections to eliminate the need of separate mounting frames.

A further object of the present invention resides in the provision of molded plastic prescription lenses adapted to be pivotally mounted upon a pair of conventional normal vision spectacles to provide full area close work or reading glasses when moved to operative position in front of conventional spectacle lenses.

Still another object of the present invention resides in the provision of plastic prescription lenses molded to the required curvature to cooperate with the lenses of a user's normal vision spectacles to provide the desired working distance power.

Still another object of this invention resides in the provision of molded plastic prescription lens assemblies adapted for pivotal association with the lenses and frame of a pair of normal vision spectacles and having auxiliary lenses adapted to have selected areas cut away to provide the desired working distance power factor over any desired area of the normal vision spectacle lenses thereby enabling an optometrist to provide close work or reading glasses custom made to meet the peculiar needs of his patients.

Further objects of the invention will appear from the following description and appended claims when read in conjunction with the attached drawings wherein:

Figure 1 is a front elevational view of an attachment lens assembly produced in accordance with the present invention;

Figure 2 is a sectional view taken on line 2—2 of Figure 1 and illustrating in dot-dash lines the normal vision spectacle frame and lens upon which the attachment of the present invention is mounted;

Figure 3 is a sectional view taken on line 3—3 of Figure 1 illustrating the construction of the laterally extending bridge provided to prevent relative rotation of the auxiliary lenses around the bridge securing screw;

Figure 4 is a sectional view taken substantially on line 4—4 of Figure 1 and illustrating the lateral adjustment feature of the laterally extending bridge construction;

Figure 5 is a view similar to Figure 1 illustrating an attachment lens assembly of this invention having the lower part of the auxiliary lenses cut away to provide close work or reading correction over the upper area of the normal vision spectacle lenses only; and Figure 6 is a sectional view similar to Figure 3 taken on line 6—6 of Figure 5 and illustrating a modified construction for preventing relative rotation of the auxiliary lenses around the bridge securing screw.

With continued reference to the drawings wherein like reference numerals are used throughout the various figures to designate the same parts, the attachment of the present invention is generally indicated by the numeral 10.

While the attachment lens assembly 10 of the present invention may assume varying forms so long as it consists of integral lens elements, bridge segments and hinge arms, the present invention contemplates separate left and right lens and bridge units 11 and 12 composed of generally circular, concavo-convex lenses 13 and 14 having the desired optical curvatures preferably formed of plastic by means of injection molding techniques integrally with bridge segments 15 and 16 extending in opposite lateral directions from the upper adjacent edges of the lenses 13 and 14 and upwardly extending L-shaped hinge arms 17 and 18. As best shown in Figures 1 and 5 the respective bridge portions 15 and 16 are joined to hinge arms 17 and 18 by suitable reinforcing rib sections 19 and 20 extending upwardly from a top segmental edge of the respective lenses. This construction assures that the lenses 13 and 14 will be freed of all support stresses which are confined to the thicker and more substantial bridge and hinge arm elements.

Bridge portions 15 and 16 as best shown in Figures 1, 3 and 4 are in the form of flat, relatively slidable arms of substantially rectangular cross-section. Arm 15 is of lesser width than arm 16 which is provided with rearwardly extending edge flanges 21 closely but slidingly receiving the upper and lower edges 22 and 23 of rearwardly offset terminal end 24 of arm 15. This relatively slidable arrangement of arms 15 and 16 permits ready adjustment of lenses 13 and 14 in fitting the attachment to individual patients to assure the proper interpupillary distance between the attachment lenses. The engagement between flanges 21 and the edges 22 and 23 of offset terminal end 24 in addition assures accurate relative vertical positioning of bridge portions 15 and 16.

As clearly seen from Figures 1 and 4 of the drawings terminal end 24 of arm 15 is provided with a through slot 25 having an encircling recess 26 in the back surface adapted to non-rotatably but slidably receive a clamp nut 27. Nut 27 threadedly cooperates with a clamp screw 28 freely received in a circular opening 29 provided near the free end of arm 16 to clampingly secure arms 15 and 16 against relative sliding movement to maintain a selected interpupillary distance between lenses 13 and 14. Head 31 of screw 28 is disposed in overlapping relation to the outwardly disposed face of arm 16 so that it will be conveniently accessible to an optometrist enabling him to make a desired interpupillary adjustment of lenses 13 and 14 with attachment lens assembly 10 loosely mounted on the normal vision spectacles 32 of the patient which may embody simple plano lenses or no lenses at all if the patient requires no basic corrective lenses. It will also be appreciated that interengagement of flanges 21 and bridge edges 22 and 23 prevents relative rotation of lens and bridge units 11 and 12 around clamp screw 28 as an axis.

Hinge arms 17 and 18 are similar in construction and as clearly appears from Figures 1 and 2 comprise an upstanding portion 33 and a right angularly disposed terminal portion 34 extending rearwardly with respect to lenses 13 and 14. Terminal portion 34 adjacent its free end is provided with a through bore 35 adapted to receive the mid portion of a hinge pin 36 the opposite ends of which are supported in spaced upstanding ears 37 of attachment clamps 38 presently to be described. While pin 36 may be fixedly secured to either ears 37 or terminal portion 34 of hinge arms 17 and 18, it preferably has a driven fit in ears 37 and is freely but snugly received in bore 35 of hinge arms 17 and 18.

Attachment clamps 38 may be made of any suitable lightweight material but it is preferred that they be formed of plastic material similar to that used in the production of lens and bridge units 11 and 12. As clearly seen from Figure 2, clamps 38 comprise a generally horizontally disposed body portion 41 of a width slightly greater than the width of hinge arms 17 and 18 with ears 37 formed along the opposed lateral edges of the upper face. Preferably the lateral spacing of ears 37 is such that the terminal portions 34 of hinge arms 17 and 18 may be received therebetween with a light friction contact between the lateral faces of hinge arms 17 and 18 and the opposed inner faces of ears 37. This assures relative hinged movement of the connected lens and bridge units 11 and 12 as a unit with respect to clamps 38 yet a sufficient frictional engagement to assure the retention of the lenses in their inoperative position shown in dot-dash lines in Figure 2.

Body member 41 is provided with spaced clamp walls or arms 42 and 43 depending from its under face and extending in a direction normal to ears 37 along the respective front and rear edges. Walls 42 and 43 along the lower edges of their opposed inner faces are provided with oppositely facing marginal ribs 44 and define between them a vertically elongated recess 45. Recess 45 is of a width from front to back sufficient to normally freely receive the frame portion 48 of the normal vision spectacles 32 and access thereto is afforded through downwardly opening passage 49 formed between the opposed faces of ribs 44. While passage 49 is normally somewhat narrower than recess 45, the inherent springiness of wall members 42 and 43 makes it possible to readily mount clamps 38 on spectacles 32 as shown in Figure 2 by relative downward movement of walls 42 and 43 of clamps 38 along opposite sides of spectacle frame 48.

Once spectacle frame 48 is disposed in the lower portion of recess 45 walls 42 and 43, due to their resiliency, will return to their normal dependent positions lightly gripping frame 48 therebetween. At the same time the opposed inner faces of ribs 44 will come into lighter bearing contact with the portion of the lenses of spectacles 32 adjacent the gripped frame to prevent relative back and forth twisting movement of clamps 38 on spectacles 32.

As clearly seen in Figures 1 and 2, the lateral configuration of clamps 38 and ribs 44 is generally rectangular. Since the gripped portion of spectacle frames 48 is of arcuate configuration and Figure 2 is a view along a median plane through clamps 38, a clearance 51 appears between the upwardly facing edges of ribs 44 and frame 48. The opposite lateral corners of ribs 44, however, abuttingly engage the inner periphery of frames 48 at laterally spaced points to retain clamps 38 against accidental retrograde movement likely to result in disassembly of the attachment lens assembly 10 from the spectacles.

As heretofore pointed out, clamps 38 may be made of any suitable material. If formed of light resilient metal, the inherent gripping characteristics of walls 42 and 43 may alone be sufficient to assure proper mounting of attachment lens assembly 10 on spectacles 32. However, the present invention contemplates that clamps 38 also be formed of plastic material similar to that used in forming the lens and bridge units 11 and 12. Since the inherent resiliency of such material is not of the same high order as metal, the clamp walls 42 and 43 opposite the upper area of recess 45 are respectively provided with a countersunk through passage 54 and an aligned tapped passage 55 for receiving a flat headed clamp screw 56. Clamp screw 56 freely passes through passage 54 and threads into passage 55 in well known manner to draw wall members 42 and 43 toward each other into clamping relation to the frames of spectacles 32. As clearly appears from Figure 2, screw 56 is readily accesible upon pivoting lens and bridge units 11 and 12 to their inoperative position.

As clearly appears from Figure 2, both the spectacle lenses and auxiliary lenses 13 and 14 are of uniform thickness throughout and, when assembled and disposed for conjoint use, have a common principal axis. This is accomplished in the present invention by properly relating the vertical distance between the optical axes of the attachment lenses and the normal vision spectacle frame engaging portions of the clamps 38 to the vertical distance between the optical axes of the respective normal vision lenses. As a result when the clamps 38 of this invention are clampingly engaged with the normal vision spectacle frames and lenses as appears from Figure 2 after the appropriate interpupillary adjustment is made, the contacting relation of the marginal clamp ribs 44 with the normal vision spectacle frames will effectively prevent up and down as well as lateral relative shifting movement of the attachment lenses with respect to the normal vision spectacles in use. As a consequence, the desired coincidence of the optical axes of the attachment and normal vision lenses in their conjoint use positions is predetermined and it will be appreciated that slight adjustment can be effected by softening the plastic hinge arm and bending it one way or the other to vary the included angle between it and its related lens. As a consequence, a user of the present auxiliary lenses has the desired working distance power available irrespective of the area of the lenses through which the work is viewed without any prejudical prismatic effect.

It is to be understood that any clear plastic may be used in the formation of lens assembly 10 since the variations in refraction of the different plastic compositions may be compensated for by proper molding of the inner and outer curvatures of the auxiliary lenses 13 and 14. If desired suitable tinting of the plastic material may be resorted to in well known manner to obviate objectionable glare that may result because of the nature of a particular patient's activities.

From the foregoing description, it will be apparent that the auxiliary lens and bridge units of this invention may be of standard basic construction since the necessary adjustments to assure a proper interpupillary distance between lenses 13 and 14 may be readily accomplished. In addition, it is possible by proper selection of the inner and outer optical curvatures of lenses 13 and 14 to provide standard individual attachment lens and bridge units having the commonly used bifocal working distance power corrections, that is, a plus 1.00, plus 1.50 and plus 2.00 magnification, or any other magnification the manufacturer may deem advisable. Should it happen that a patient requires a different power lens for each eye, it is a simple matter for the optometrist to select standard lens and bridge units 10 and 11 of appropriate but different power and connect them to provide an attachment assembly meeting the patient's individual requirements.

These plastic standard lens and bridge units have still another advantage exemplified in Figure 5 of the drawing, namely, the ability of being readily cut by use of a jig saw or the like or some other readily available tool to tailor the attachment lens assembly to peculiar requirements of individual patients. In Figure 5 the lower portion of the lenses of lens and bridge units 11 and 12 have been sawed away to provide lenses 13a and 14a having corrective working distance power throughout the top area only of the user's normal vision spectacles. This modification of standard auxiliary attachment assembly lens and bridge units 11 and 12 may be readily effected by an optometrist in his own shop as required eliminating the need to stock anything but standard units of the three or more basic magnifying powers.

The half lenses 13a and 14a of Figure 5, admirably meet the needs of tradesmen such as bricklayers and painters who in their normal working activities require normal distance vision when looking down to walk along a scaffold, down a ladder or to pick up a brick or replenish a brush with paint from a can and working distance power to properly align a brick in a structure or lap brush strokes at approximate eye level or overhead. It will be appreciated that conventional multi-focal lenses or separate work glasses are not only inconvenient for such activities but actually dangerous due to distorted vision or leaning backward to bring the bifocal button into the line of vision which may lead to falls, sometimes fatal, from scaffolds and ladders. It will be appreciated that other areas of the auxiliary lenses may be cut away to provide the working distance power over other areas of the spectacle lens to meet patient requirements in other walks of life.

In lieu of flanges 21, the bridge portions 15 and 16 may be provided respectively with mating laterally extending ridges 61 and grooves 62 (Figure 6) to assure accurate relative vertical positioning of lenses 13 and 14 and prevent relative rotation of lens and bridge units 11 and 12 around clamp screw 28.

It will be appreciated that the integrally molded lens and bridge units 11 and 12 provided by the illustrated embodiments of this invention assure an attachment lens assembly 10 of extremely light weight. It, unlike previously proposed attachments made up of optically ground lenses mounted in auxiliary frames, is not an unwieldy attachment of substantial weight that makes it difficult and uncomfortable to maintain the supporting spectacles in place upon the nose of the user. Furthermore, the plastic lens assembly of this invention is extremely inexpensive to manufacture and attach to the normal vision spectacles. As a consequence, it can be sold at a price that is a small fraction of the cost of a glass lens and frame attachment and, therefore, can be replaced at little expense should the hinges break or the lenses become scratched and marred in use.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An ophthalmic attachment for providing a pair of normal vision spectacles with a desired working distance power comprising an auxiliary attachment assembly made up solely of a pair of molded plastic units each comprising integrally formed lens elements, bridge segments and hinge arms each said hinge arm having a lateral hinge axis and being disposed at right angles to the plane of the concave surface of its lens which is formed to the desired optical curvature and has its optical axis spaced from the longitudinal plane of its hinge arm axis to assure a predetermined horizontal disposition of the optical axis of its lens; means for connecting said bridge segments to effect a unitary assembly of said pair of molded plastic units; and means individual to each hinge arm for pivotally supporting each of said pair of molded units and adapting said supporting means for respective connection to the frame portion of a respective normal vision spectacle lens, said means including spectacle frame engaging formations to clamp said frame portion of said spectacle frame so as to resist lateral and vertical relative movement of said molded plastic units with respect to said spectacle lenses once the clamp means is tightened.

2. The ophthalmic attachment of claim 1 together with means for selectively connecting said molded units together with their bridges in a selected one of several overlapped relations thereby assuring relative lateral adjustability of the attachment lens units and establishment of a desired interpupillary distance between the attachment lenses corresponding to that of the normal vision spectacles upon which the attachment lenses are to be mounted thereby assuring adjustability for fitting a patient to establish coincidence of the optical axes of said respective pairs of lens before final setting of said clamp means.

3. An ophthalmic attachment for use with a pair of normal vision spectacles to augment the spectacle lenses and provide a desired working distance power factor comprising a pair of individually molded lens and bridge units having the required optical curvature formed in the respective lenses to respectively augment the optical characteristics of said normal vision spectacle lenses and also having individual integral lens supported hinge arms; means on the respective bridge portions of said molded lens and bridge units adapting said bridge units for mating, lateral sliding connection whereby standard production molded lens and bridge units of different optical power may be stocked and assembled by an optometrist in accord with individual patient requirements to provide an attachment unit having the proper individual lens power and interpupillary distance; and clamp means pivotally carried by said hinge arms and adapted to cooperate with the normal vision spectacles to hingedly mount said unitary molded plastic lens and bridge units on said normal vision spectacles, and comprising a molded plastic member providing a body having upstanding laterally spaced attachment ears for receiving a selected hinge arm and depending laterally extending bifurcated mounting arms adapted to receive between them a portion of the spectacle rim of said normal vision spectacles; a hinge pin extending through said ears and the hinge arm received therebetween for hingedly connecting said arm to said body; and a clamp screw passing freely through one of said bifurcated arms and threaded into the other of said bifurcated arms and adapted to draw said arms together to adjustably clamp said portion of said spectacle rim therebetween whereby said attachment unit may be fixedly mounted on said normal vision spectacles for hinged movement between an inoperative position and an operative position with said attachment lenses disposed in front of said spectacle lenses.

4. The ophthalmic attachment of claim 1 wherein said clamp means comprises a relatively thin body having spaced integrally formed upstanding ears for hingedly receiving said hinge arm therebetween, integrally formed, depending clamp arms disposed at right angles to said ears for receiving a portion of said normal vision spectacles therebetween and a clamp screw spaced from the free ends of said clamp arms sufficiently to clear the received portion of said normal vision spectacles, interconnecting said arms and adapted to draw said depending arms toward each other to clamp said portion of said normal vision spectacles therebetween.

5. The ophthalmic attachment of claim 2 wherein said means connecting said units comprises a headed clamp screw mounted in one of said bridge portions and slidably associated with the other of said bridge portions, interfitting formations on the respective bridge portions for preventing relative angular movement of said lens, bridge and hinge arm units and a clamp nut threadedly engaging said clamp screw and adapted when threaded home to clamp said bridge portions between said screw head and nut to secure said pair of units in selected laterally adjusted relation.

6. The attachment of claim 1 wherein said attachment lenses are coextensive in area with respect to said normal vision spectacle lenses whereby the desired working distance power factor is available to the user irrespective of the viewing angle through the spectacle and attachment lenses.

7. A molded ophthalmic attachment for spectacles comprising a pair of plastic lenses molded to the prescribed optical curvature to augment the corrective optical characteristics of the spectacles and cooperate therewith to provide the desired working distance power and having respectively mating integrally molded bridge portions and respective integrally molded, right angularly disposed hinge arms having a laterally extending hinge axis related to the optical axes of its respective lens to assure the disposition of its optical axis, when positioned for use with a normal vision spectacle lens, in the lateral plane containing the optical axis of said normal vision lens with which it is to be associated; a pair of molded attachment clips each having a recess in a face thereof to pivotally receive a respective one of said hinge arms, spaced, depending attachment legs disposed at right angles to the axis of its respective recess and providing free ends adapted to receive a portion of the rims of said spectacles therebetween and aligned through openings inwardly from their free ends; a clamp screw freely passing through the opening of one of said legs and threaded into the aligned opening of the other mating leg to draw said legs toward each other and clamp said portion of said spectacle rims therebetween; and respective pivot pins mounted in each of said attachment clips and extending across their respective recesses and through the respective hinge arms associated therewith to hingedly connect said respective integrally molded plastic lens and bridge portions to said respective attachment clips.

8. An ophthalmic unit for use in fabricating an attachment assembly for use with a pair of normal vision spectacles comprising a molded plastic lens formed to provide predetermined optical power and having a laterally extending integrally molded plastic bridge portion at one side and an upwardly and rearwardly extending integrally molded hinge arm at the upper edge, the hinge arm providing a laterally extending hinge axis related to the optical axis to assure the disposition of its optical axis when positioned for use with a normal vision spectacle lens, in the lateral plane containing the optical axis of said normal vision lens with which it is to be associated, a clamp member comprising laterally spaced upstanding ears for receiving said hinge arm and depending spaced clamp arms disposed at right angles to said ears for clampingly engaging a portion of said pair of normal vision spectacles and a hinge pin hingedly connecting said hinge arm and said spaced ears whereby said lens and bridge portion may be moved to selected angular positions with respect to said clamp member.

References Cited in the file of this patent

UNITED STATES PATENTS

| 194,345 | Franklin | Aug. 21, 1877 |
| 505,650 | Francis | Sept. 26, 1893 |
| 2,326,787 | Lorig | Aug. 17, 1943 |
| 2,545,673 | Pozarik | Mar. 20, 1951 |
| 2,574,749 | Mendelsohn | Nov. 13, 1951 |
| 2,584,000 | Ehlert et al. | Jan. 29, 1952 |
| 2,616,082 | Creighton | Nov. 4, 1952 |

FOREIGN PATENTS

| 27,321 | Great Britain | Dec. 6, 1911 |
| 268,699 | Great Britain | Apr. 7, 1927 |